United States Patent
Ben-Yehuda et al.

(10) Patent No.: US 7,636,800 B2
(45) Date of Patent: Dec. 22, 2009

(54) METHOD AND SYSTEM FOR MEMORY ADDRESS TRANSLATION AND PINNING

(75) Inventors: Shmuel Ben-Yehuda, Haifa (IL); Scott Guthridge, New York, NY (US); Orran Yaakov Krieger, Newton, MA (US); Zorik Machulsky, Gesher HaZiv (IL); Julian Satran, Atlit (IL); Leah Shalev, Zichron-Yaakov (IL); Ilan Shimony, Haifa (IL); James Xenidis, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 11/426,588

(22) Filed: Jun. 27, 2006

(65) Prior Publication Data
US 2007/0299990 A1 Dec. 27, 2007

(51) Int. Cl.
G06F 13/28 (2006.01)
G06F 13/00 (2006.01)
G06F 12/00 (2006.01)
G06F 9/26 (2006.01)
G06F 9/34 (2006.01)

(52) U.S. Cl. .......................... 710/28; 710/26; 710/22; 710/33; 711/114; 711/147; 711/150; 711/209; 711/144

(58) Field of Classification Search .................. 710/26, 710/22, 28, 33; 711/114, 147, 150, 209, 711/144
See application file for complete search history.

(56) References Cited

U.S. PATENT DOCUMENTS

| | | | | |
|---|---|---|---|---|
| 4,638,426 A | * | 1/1987 | Chang et al. ............... | 711/216 |
| 5,659,798 A | * | 8/1997 | Blumrich et al. ............ | 710/26 |
| 5,666,514 A | * | 9/1997 | Cheriton ..................... | 711/144 |
| 5,765,022 A | * | 6/1998 | Kaiser et al. ................ | 710/22 |
| 5,983,332 A | | 11/1999 | Watkins | |
| 6,356,996 B1 | * | 3/2002 | Adams ........................ | 712/226 |
| 6,859,867 B1 | * | 2/2005 | Berry .......................... | 711/206 |
| 6,934,765 B2 | * | 8/2005 | Held et al. ................... | 709/245 |

(Continued)

FOREIGN PATENT DOCUMENTS

WO    WO 9529446 A1 * 11/1995

OTHER PUBLICATIONS

IBM Technical Disclosure Bulletin, Jul. 1980, vol. 23, Issue No. 2, pp. 704-705.*

(Continued)

*Primary Examiner*—Alford W Kindred
*Assistant Examiner*—Farley J Abad

(57) ABSTRACT

A method and system for memory address translation and pinning are provided. The method includes attaching a memory address space identifier to a direct memory access (DMA) request, the DMA request is sent by a consumer and using a virtual address in a given address space. The method further includes looking up for the memory address space identifier to find a translation of the virtual address in the given address space used in the DMA request to a physical page frame. Provided that the physical page frame is found, pinning the physical page frame al song as the DMA request is in progress to prevent an unmapping operation of said virtual address in said given address space, and completing the DMA request, wherein the steps of attaching, looking up and pinning are centrally controlled by a host gateway.

9 Claims, 4 Drawing Sheets

U.S. PATENT DOCUMENTS 7,254,696 B2 * 8/2007 Mittal et al. ................. 712/210
7,278,008 B1 * 10/2007 Case et al. ................... 711/209
2005/0027900 A1 * 2/2005 Pettey .......................... 710/22

OTHER PUBLICATIONS

IBM Technical Disclosure Bulletin, Jun. 1976, vol. 19, Issue No. 1, pp. 83-84.*
IBM Technical Disclosure NB82081583, "Page Pinning by Software for I/O Requests," Aug. 1982, vol. 25, Issue No. 3B, pp. 1583-1585.*
H. Hartig et al. "An I/O Architecture for Microkernel-Based Operating Systems". Technical Report TUD-FI03-08-Juli-2003, TU Dresden, Jul. 2003, Dresden, Germany.
AMD's IOMMU http://www.amd.com/us-en/assets/content_type/white_papers_and_tech_docs/34434.pdf.
Quadrics VM patch http://www.ussg.iu.edu/hypermail/linux/kernel/0504.3/0640.html.
PCI SIG http://www.pcisig.com/home.
U.S. Appl. No. 11/333,066, Ben-Yehuda et al.
U.S. Appl. No. 11/333,716, Engbersen et al.
AD-AG accessed by the examiner on Feb. 17, 2008.

* cited by examiner

US 7,636,800 B2

METHOD AND SYSTEM FOR MEMORY ADDRESS TRANSLATION AND PINNING

CROSS REFERENCE TO RELATED APPLICATIONS

The present invention is related to U.S. patent application Ser. No. 11/333,066, filed on Jan. 11, 2006, titled "A METHOD AND SYSTEM FOR MEMORY PROTECTION AND SECURITY USING CREDENTIALS", and to U.S. patent application Ser. No. 11/333,716, filed on Jan. 11, 2006, titled "A METHOD AND SYSTEM FOR PROTECTION AND SECURITY of IO DEVICES USING CREDENTIALS".

FIELD OF THE INVENTION

The present invention relates generally to the field of computer and processor architecture. In particular, the present invention relates to a method and system for memory address translation and pinning.

BACKGROUND OF THE INVENTION

The architecture of most current personal computer (PC) systems, from desktop to server, may be conceptually and schematically illustrated in FIG. 1, to which reference is now made.

PC system 10 typically includes memory 20, which may be embedded within one or more processing units 12, or may be separate therefrom. Processing units 12 are typically coupled with IO devices 14[1]-14[i] via one or more IO buses 16, e.g., peripheral component interconnect (PCI) buses. Optionally, in order to make the connection between processing units 12 and IO devices 14[1]-14[i] quicker, PC system 10 may also include one or more components that communicate with the processing units 12 and control the interaction with memory 20, and the IO buses 16, e.g., a north bridge unit 18.

Processing unit 12 typically includes a Central Processing Unit (CPU) 26 that typically refers to virtual memory addresses in virtual memory address space, which get translated by the memory management unit (MMU) 24 into physical addresses.

Typically, when an IO device uses direct memory access (DMA) operations to write or read data from memory 20, that data is located in physical page frames, and a consumer, e.g., a hypervisor, an OS, or a process using IO having its own virtual memory space, will make use of this data. The consumer typically accesses the data through a virtual address which is translated by the MMU 24 to a physical address.

The translation from virtual address space to physical address space is required to remain stable for as long as the DMA operation is in progress, e.g., it cannot refer to another physical page for as long as the DMA is in progress. If this requirement is violated data corruption may occur. This requirement is referred hereinafter as memory pinning.

Known methods of memory pinning typically communicate physical addresses to the IO device. These methods typically include translation from virtual address to physical address at the upper layers of system 10, e.g., at the OS or the hypervisor (or another component that may manage the operating systems of system 40 and allocate the IO memory space per consumer, not shown in FIG. 1), and pinning the translation. As a result, the IO path is longer and slower, since the involvement of the upper layers is necessary for each DMA operation. Alternatively, the translation is done in advance, at the memory space of the consumer, by pre-registering all of the required physical memory. The drawback of this approach is the "waste" of the physical memory, which is a precious resource, e.g., as long as a page frame is pinned for a given process, no other process can make use of it, even if no IO operation is executed to or from that page frame.

SUMMARY OF THE INVENTION

According to a first aspect of the present invention there is provided a computer-implemented method for a centralized memory address translation and pinning. The method includes attaching a memory address space identifier to a direct memory access (DMA) request, the DMA request is sent by a consumer and using a virtual address in a given address space. The method further includes looking up for the memory address space identifier to find a translation of the virtual address in the given address space used in the DMA request to a physical page frame. Provided that the physical page frame is found, pinning the physical page frame as long as the DMA request is in progress to prevent an unmapping operation of said virtual address in said given address space, and completing the DMA request, wherein the steps of attaching, looking up and pinning are centrally controlled by a host gateway.

According to a second aspect of the present invention there is provided a computer-implemented method for communicating an unmap operation of a virtual address in a virtual memory address space. The method includes marking that the virtual address is intended to be unmapped, sending an address space identifier and the virtual address of the virtual address space to determine whether the virtual address can be unmapped, and determining whether the virtual address can be unmapped.

According to a third aspect of the present invention there is provided a system for a centralized memory address translation and pinning. The system includes a host gateway arranged to attach a memory address space identifier to a direct memory access (DMA) request, the DMA request is sent by a consumer and using a virtual address space. The system further includes a second component arranged to look up for the memory address space identifier to find a translation of the virtual address space used in the DMA request to a physical page frame, and a third component arranged to pin the physical page frame as long as the DMA request is in progress to prevent an unmapping operation of the physical page frame, wherein the second and third components are centrally controlled by the host gateway.

According to a fourth aspect of the present invention there is provided a computer software product, including a computer-readable medium in which computer program instructions are stored, which instructions, when read by a computer, cause the computer to perform a method for a centralized memory address translation and pinning. The method includes attaching a memory address space identifier to a direct memory access (DMA) request, the DMA request is sent by a consumer and using a virtual address in a given address space. The method further includes looking up for the memory address space identifier to find a translation of the virtual address in the given address space used in the DMA request to a physical page frame. Provided that the physical page frame is found, pinning the physical page frame as long as the DMA request is in progress to prevent an unmapping operation of said virtual address in said given address space, and completing the DMA request, wherein the steps of attaching, looking up and pinning are centrally controlled by a host gateway.

BRIEF DESCRIPTION OF THE DRAWINGS

Embodiments of the present invention will now be described, by way of examples only, with reference to the accompanying drawings in which.

DESCRIPTION OF EMBODIMENTS OF THE PRESENT INVENTION

System Overview

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2:
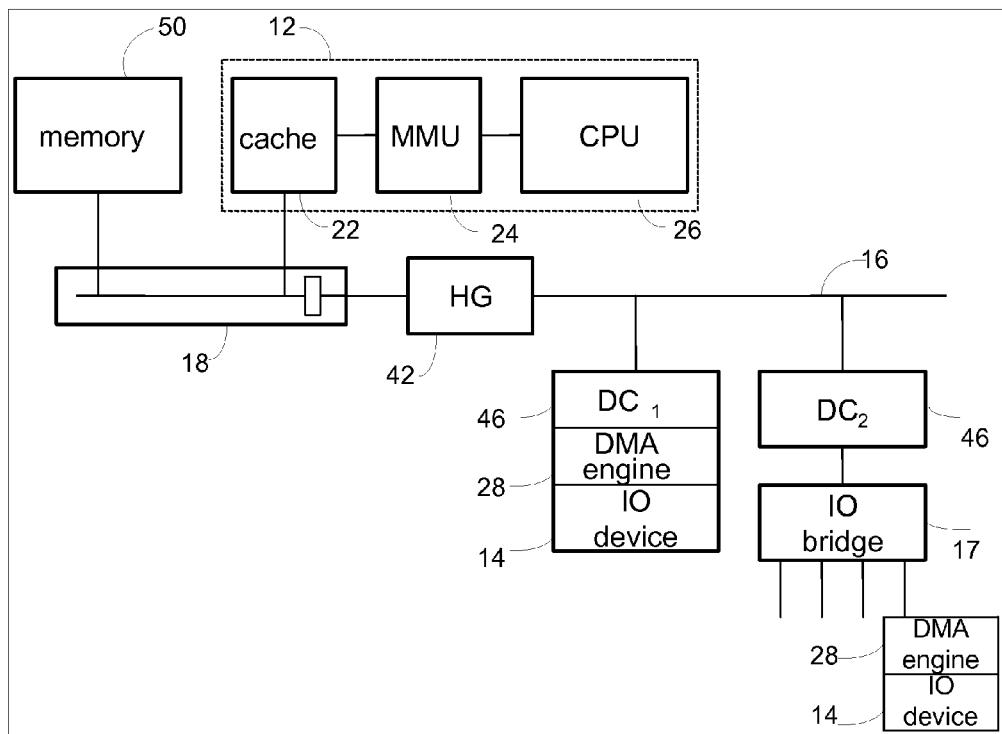
FIG. 2 is a schematic block diagram of a computer system in accordance with an embodiment of the present invention.

Reference is now made to FIG. 2 which is a schematic block diagram of a computer system 40 in accordance with an embodiment of the present invention. System 40 may utilize memory pinning and translation as will be described in detail below.

In system 40, a hypervisor, an OS, or a process using IO having its own virtual memory space, (not shown), hereinafter collectively referred to as a "consumer", in communication with memory 50 may request a direct memory access (DMA) from one or more IO devices 44[1]-44[i] to memory 50. The DMA request may include, for example, the ID of the consumer, the virtual address in the address space of the consumer (the virtual address may supply both a page and the offset within that page), and the length of the request. The DMA request may be sent to Host Gateway (HG) 42, which may attach an address space identifier to the DMA request, where the address space identifier is that of the initiating consumer.

Figure 1:
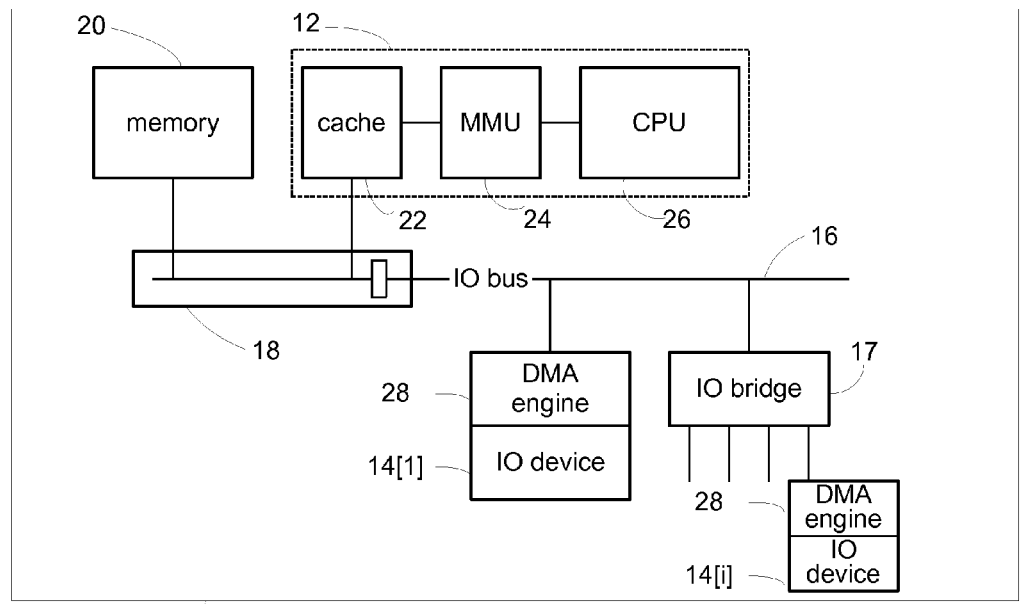
FIG. 1 is a schematic block diagram of a prior art computer system.

As shown in FIG. 1, HG 42 may be coupled with one or more IO buses 16, e.g., peripheral component interconnect (PCI) buses, and with one or more north bridges 18 that may control the interaction with memory 50, and the IO buses 16.

The DMA request may be sent from HG 42 to a device controller (DC) 46 in a format that may include the address space of the consumer, virtual address, offset, and the length mentioned above. DC 46 may then send the DMA request to IO devices 14[1]-44[i]. After the DMA request is executed, DC 46 may send to HG 42 the buffers involved in the IO operation in the same format (address space, virtual address, offset, length). HG 42 may then do the actual data placement into memory 50.

According to some embodiments of the present invention, HG 42 may be separated from the processing unit 12 (as shown in FIG. 1). In this configuration HG 42 may first do address translation, then pin the translations and pages involved in the DMA request and IO operation, and then do the actual data placement.

According to some other embodiments of the present invention, HG 42 may be integrated with processing unit 12, and more specifically with MMU 24. In this configuration (not shown), HG 42 may use virtual addresses when accessing memory 50, and the MMU 24 may control and execute the translation, handle cases of IO miss interrupt, etc.

Pinning and Translation Operations

Figure 3:
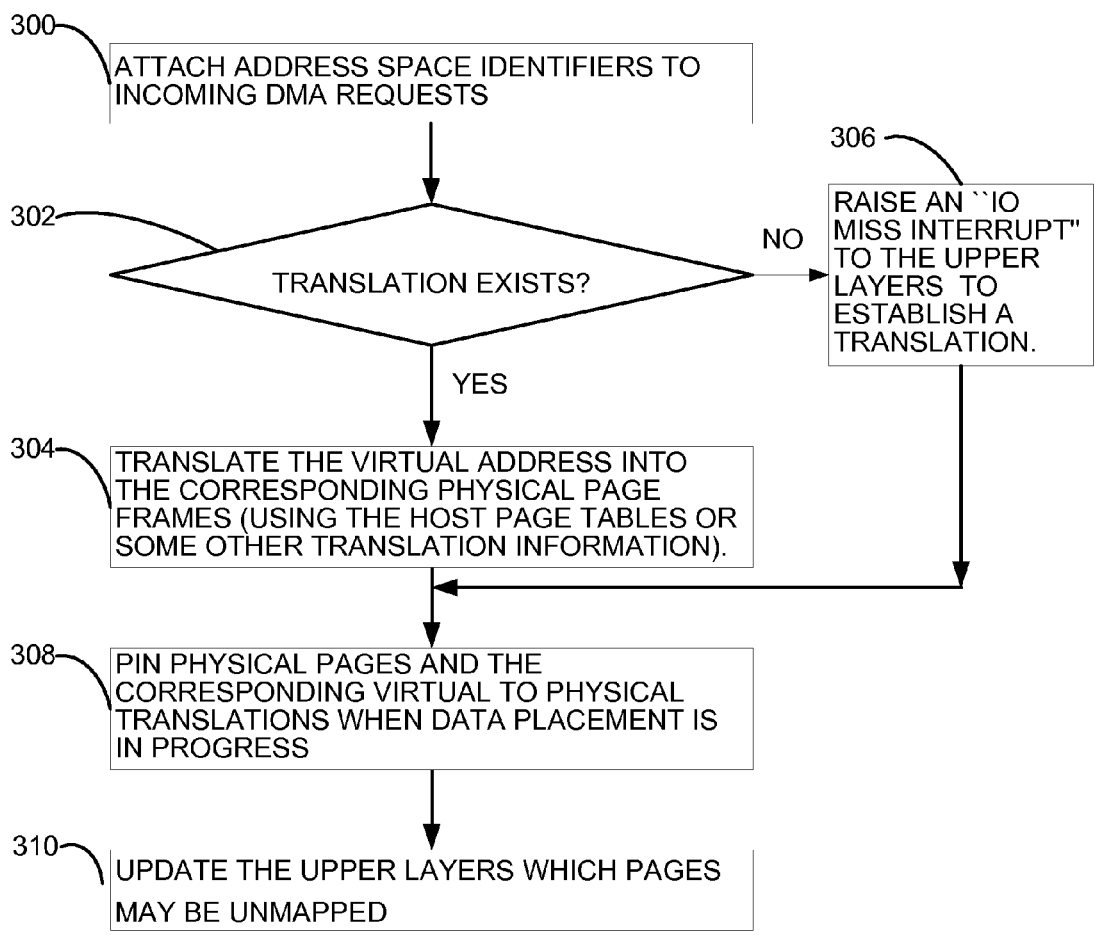
FIG. 3 is a schematic flow chart diagram of a method for memory pinning and translation, in accordance with embodiments of the present invention.

Reference is now made to FIG. 3 which is a schematic flow chart diagram of a method for memory pinning and translation, in accordance with embodiments of the present invention. In the description of this method below the entity which is responsible for the memory pinning and translation, e.g., HG 42, is separate from processing unit 12. According to this configuration, HG 42 may be responsible to attach (step 300) memory address space identifiers to incoming DMA requests. Thereafter, whenever HG 42 receives an incoming DMA request, it may check (step 302) whether a translation exists for the buffers referenced in the request, e.g., by looking up the virtual addresses of the buffers in the address space(s) identified by the address space identifier(s) attached to the DMA request, or other pre-defined address space(s). If all translations exist and are valid, HG 42 may translate (step 304) the virtual addresses into the corresponding physical page frames (using the host page tables or some other translation information).

If no translation exists, HG 42 may raise (step 306) an "IO miss interrupt" call to the upper layers of system 40, e.g., to the hypervisor or to the OS, to establish a translation. The hypervisor may reflect the IO miss interrupt to an OS running under it, if the IO miss interrupt was caused by an IO operation done by an application running under that OS.

When a translation is found, e.g., the respective page frames, the physical pages may be pinned (step 308) as long as the DMA operation and the data placement in the memory is in progress, so that the upper layers will not unmap them while the data placement is in progress.

Since in accordance to this embodiment of the present invention, the DMA operation is performed between the consumer, HG 42, DC 46, and the 10 device, without the involvement or control of the upper layers (except in the specific cases described above), HG 42 may be required to prevent the upper layers from unmapping a page while it is involved in DMA operation, and the upper layers may perform an unmapping protocol with HG 42 before unmapping a page. To do so, HG 42 may mark which pages are currently involved in DMA operation and data placement and thus cannot be unmapped by the upper layers, and mark which pages that have been involved in DMA 'read' operations are dirty without the knowledge of the upper layers. These markings may be achieved, for example, by using dirty bits for each type of mark.

When the DMA operation ends, HG 42 may update (step 310) the upper layers which pages may be unmapped, for example, by updating the dirty bits.

It should be noted that in the configuration that HG 42 is integrated with MMU 24, the pinning and translation operations may done via the MMU, in the same way it is done for consumer's CPU memory accesses. In this mode, HG 42 may be responsible for attaching address space identifiers to incoming DMA requests. MMU 24 may also take care of dirtying the page table entries automatically.

Data Transaction

Figure 4:
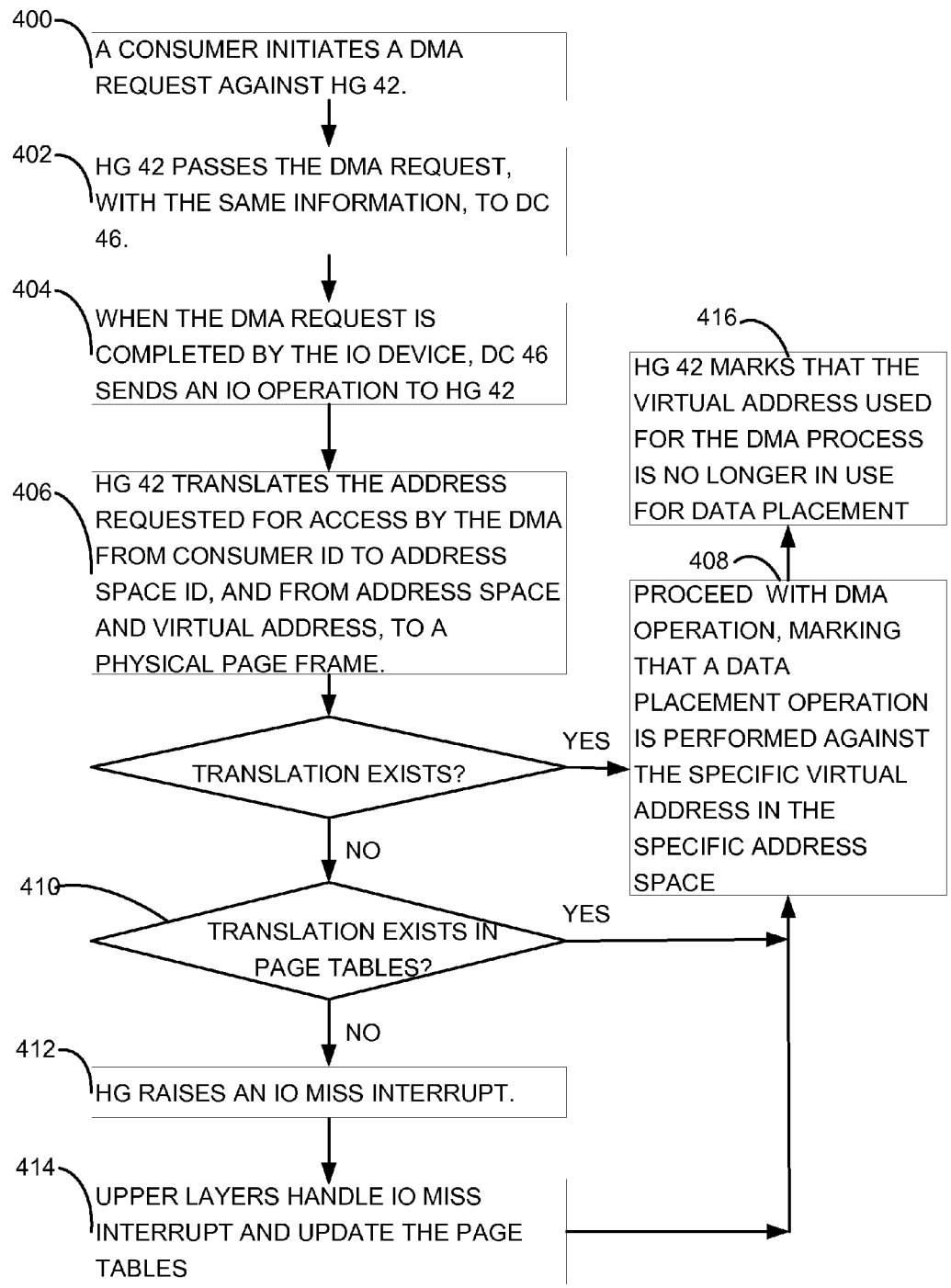
FIG. 4 is an exemplary flow chart diagram of a method of data transaction in accordance with an embodiment of the present invention.

In conjunction with FIGS. 2 and 3, reference is now made to FIG. 4 which is an exemplary flow chart diagram of a method of data transaction in accordance with an embodiment of the present invention.

A consumer may initiate (step 400) a DMA request against HG 42. HG 42 may receive the consumer ID, the virtual address in the consumer's address space (the virtual address may supply both a page and the offset within that page, and the length of the DMA request).

It should be noted that the consumer may initiate the DMA request directly against HG 42, without informing the upper layers that the DMA request has been initiated.

HG 42 may pass (step 402) the DMA request, with the same information, to DC 46. The information may be protected in order to maintain its integrity, as described in U.S. Ser. No. 11/333,066, filed on Jan. 11, 2006, titled "A METHOD AND SYSTEM FOR MEMORY PROTECTION AND SECURITY USING CREDENTIALS", which is assigned to the common assignees.

At some point in time when the DMA request is completed by the IO device, DC 46 may send (step 404) an IO operation to HG 42, including the buffers information which is needed to complete the DMA operation to its destination at the consumer's memory. For example, for each buffer the address of the buffer in the consumer's virtual address space, the consumer ID (which is then translated to address space ID), the length of the buffer, etc., may be included. Optionally, the credential protecting the buffer may also be included, etc.

HG 42 may check the validity of the address provided by the IO operation, and if it valid, HG 42 may translate (step 406) the address requested for access by the DMA request from consumer ID to address space ID, and then from address space and virtual address, as described above, to a physical page frame.

If a translation is found, the HG 42 may proceed (step 408) with the DMA operation, marking that a data placement operation is performed against the specific virtual address in the specific address space. If the translation is not found, HG 42 may check (step 410) the page tables for this specific address space in memory 50. It should be noted that the page tables may be located in memory 50 but they may also be located in processing unit 12. The page table is a data structure shared between CPU 26 and the most privileged software application running on the CPU, e.g., the OS or the hypervisor.

If the translation is found in the page tables, HG 42 may use the translation and proceed with the IO operation, marking as described above in step 408 that the IO operation is in progress. If the translation is not found in the page tables, HG may raise (step 412) an IO miss interrupt. Once the IO miss interrupt is handled (step 414) by the upper layers, e.g., the hypervisor or the OS, as will be described in detail below and the page tables have been updated, HG 42 may proceed with the IO operation, or alternatively, HG 42 may abort the IO operation, or take any other action, depending on the response received from the upper layers.

It should be noted that the term IO miss interrupt includes early interrupts, e.g., an interrupt that is raised when HG 42 does not find the required translation information when the DMA request is received from the consumer before it is sent to DC 46, or late interrupts, an interrupt that is raised when HG 42 does not find the required translation information when DC 46 sends the IO operation, or a combination of both. In both cases, HG 42 may do the same translation and pinning operations. The difference is the length of time a translation remains pinned. The earlier the translation is done the longer it remains pinned. Therefore, a translation which is established due to an early interrupt will remain pinned longer than a translation established after a late interrupt.

Once the IO operation is completed and the data placement operation is finished, HG 42 may mark (step 416) that the virtual address used for the DMA process is no longer in use for data placement.

It should be noted that when HG 42 is required to do an operation which requires more resources from HG 42 than the routine operations it perform, e.g., having a lookup operation in memory 50, raising an IO miss interrupt, etc., it may be required to pace the incoming DMA requests. HG 42 may do any of the following, in decreasing orders of desirability.

HG 42 may request DC 46 to retry the DMA request. It is then the responsibility of DC 46 to retry the DMA request in the near future, and HG 42 may take actions to guarantee that a mapping will exist when the DMA request is retried.

Alternatively, HG 42 may do the DMA request to a pre-allocated list of free pages in memory 50, and then raise the IO miss interrupt to the upper layers to fix the mappings so that the data ends up mapped wherever the consumer expects it.

A less preferred alternative is to fail the DMA request and to expect a retry to happen eventually. It should be noted that since HG 42 is allowed to fail any DMA request that does not have a mapping, HG 42 may effectively require pinning all IO buffers in advance, e.g., by failing all other DMA requests/IO operations.

Another option is to buffer the DMA request on HG 42 itself. This option is the most expensive option. An Additional option is for DC 46 to issue an explicit prefetch request to HG 42. Such a request may include one or several buffer addresses that HG 42 should establish translations for.

As previously mentioned, there may be cases that HG 42 raises an IO miss interrupt. When the hypervisor receives an IO miss interrupt from HG 42, the hypervisor may establish a valid mapping for the given address and a range in the given address space. If the address space belongs to an OS, the OS does the mapping itself. If the address space belongs to an application running inside an OS, it reflects the IO miss interrupt to the OS and lets the OS to handle it. Once the page tables have been updated, HG 42 is notified and the DMA operation may proceed.

It should be noted that unlike state of the art page faults which are typically synchronous, e.g., happen for processes that are currently executing, 10 miss interrupts are asynchronous in nature. Page faults managed by the MMU are typically raised by the MMU when the currently executing code references a virtual address that does not have a valid translation to a physical address. These translations are per address space, e.g., the same virtual address in different address space may point to different physical addresses. When a page fault occurs, it occurs for a translation in the current address space, which is the address space of the currently executing code.

It should be noted that unlike page faults, IO miss interrupts may be raised as a result of IO activity which may not necessarily be related to the currently running code and its address space.

Because state of the art page faults are typically raised on behalf of the code currently executing, which is running in a specific well known address space, it is essentially not required to pass to component that handles the page in which address space the page fault should be handled. As shown above, this is not the case for IO miss interrupt; thus HG 42 may be required to communicate to the consumer code which handles IO miss interrupt, e.g., in which address space this IO miss interrupt should be handled. This additional information may be passed on the IO miss interrupt stack or in some architecture specific register, depending on the architecture.

Unmapping a Page

As previously mentioned, HG 42 is required to prevent the upper layers from unmapping a page while that page is involved in DMA operation, e.g., data is written to it. Therefore, when, for example, a hypervisor or an OS are required to unmap a page, they have to communicate their intent to unmap the page to HG 42, because that intended-to-be-unmapped page may be involved in an IO operation, and in that case, the unmapping operation should be prevented to avoid data corruption.

Figure 5:
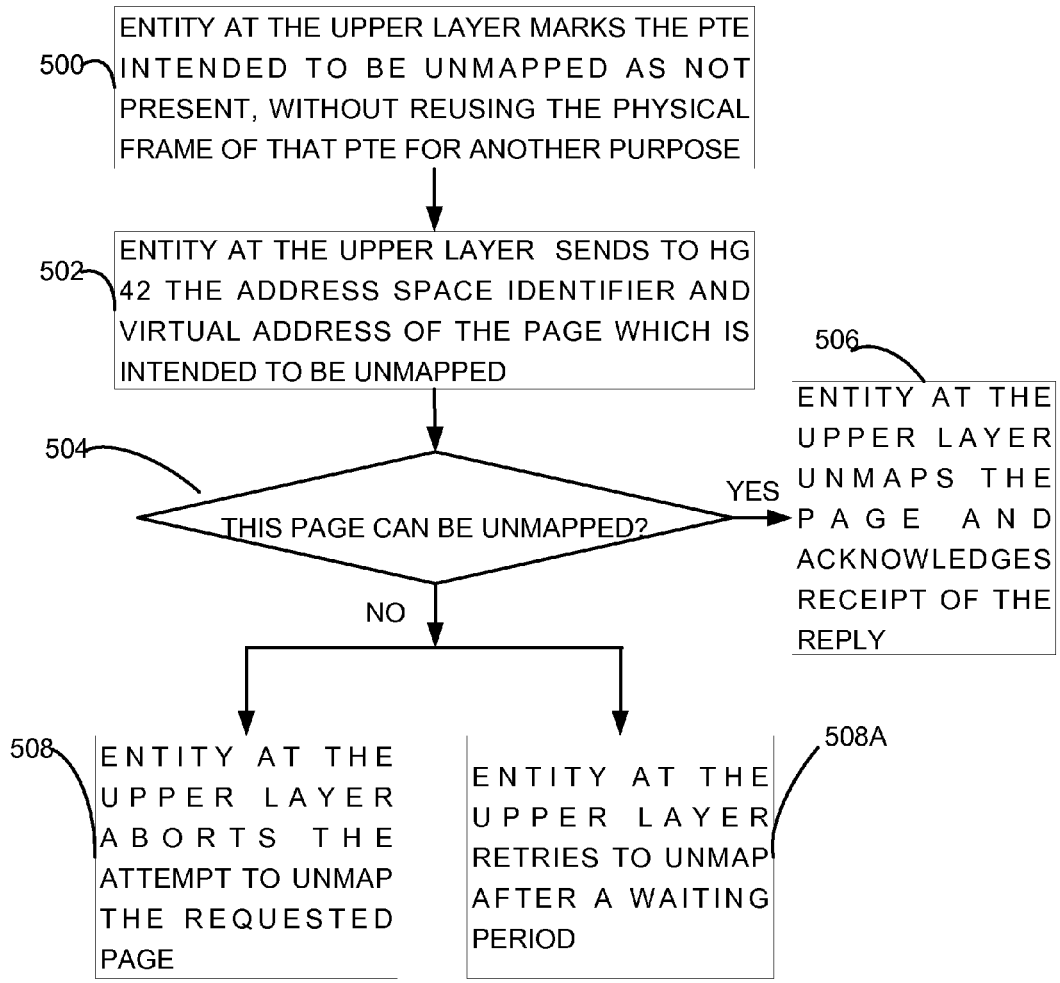
FIG. 5 is a flow chart diagram of a method for communicating an unmap operation.

Reference is now made to FIG. 5 which is a flow chart diagram of a method for communicating to HG 42 an unmap operation. The communicating entity may be at the upper layer of system 40, for example, an OS or a hypervisor which may control the unmap operation.

Initially, the entity at the upper layer may mark (step 500) the Page Table Entry (PTE) which is intended to be unmapped as not present, but do not reuse the physical frame of that PTE for another purpose. Then, the entity at the upper layer may send (step 502) to HG 42 the address space identifier and virtual address of the page which is intended to be unmapped. HG 42 may check (step 504) if this page can be unmapped, e.g., if a data placement is in progress the unmap operation cannot be done.

In case HG 42 replies that the page may be unmapped, the entity at the upper layer may unmap (step 506) the page and acknowledge receipt of the reply. Alternatively, if the unmapping cannot be done, the entity at the upper layer may abort (step 508) the attempt to unmap the requested page or retry (step 508A) to unmap after a waiting period.

It should be noted that the decision between the two alternatives is effected mainly by the reason the unmapping operation was originally requested. For example, if it was because a process exited, the likely decision is to retry it. If it was because of memory shortage, aborting the unmap operation and trying some other page is more likely.

It should be further noted that this method for communicating the unmap operation may be required when unmapping PTE's in the address space of a consumer that uses virtual addresses for IO, but may not be required otherwise. In this case, the upper layer, e.g., OS or hypervisor, respectively, may be required to grant the consumer a credential before the IO operation is initiated, as described in U.S. application Ser. No. 11/333,066, filed on Jan. 11, 2006, titled "A METHOD AND SYSTEM FOR MEMORY PROTECTION AND SECURITY USING CREDENTIALS", which is assigned to the common assignees. Additional optimizations may also be possible, by restricting the IO targets to be a subset of the translations for a given page table, so that only those translations will use the method for communicating the unmap operation described above.

Scalable and Distributed System

In accordance with some embodiments of the present invention, the proposed system is scalable, e.g., additional consumers, IO devices, host gateways (HG) and device controllers (DC) may be easily added to the system, as will be described in detail below.

The scalability of the system may be achieved by distributing the information which is important for the devices that may be added to the system. In accordance with some embodiments of the present invention, DC 46 may keep its relevant translation control entries (TCE). A TCE is a table of the page entries and their corresponding virtual address that are coupled with an IO device. DC 46 may keep a single TCE for all IO devices that it controls, or more than one TCE, each TCE for one IO device that DC 46 controls. From the view point of a consumer, e.g., a hypervisor, an OS, or a process using IO having its own virtual memory space, the IO translation table of the consumer is distributed between all DC's 46 in the form of the TCE's that are distributed. All mappings that may be required by a specific consumer may be marked with a mapping ID, $M_{ID}$, which may be used, for example, to manage the credentials as will be described below. It should be noted that a single $M_{ID}$ may be used to manage many capabilities In addition, a mapping credential, $CAP_M$, may verify one or more TCE's where:

$TCE_i$=[virtual address region, physical address, flags]
$CAP_{Mi}$=[$M_{ID}$, $TCE_i$, time, protection bits]

i: one or more TCE entries identified by the same $M_{ID}$.

When HG 42 receives an IO request from a consumer, and therefore, mapping may be required, HG 42 may create, sign $CAP_M$ and send it to the relevant DC 46.

It should be noted that $CAP_M$ may be renewed in case DC 46 fails to provide HG 42 the requested DMA operation by a predefined time window (TW). Renewal of $CAP_M$ is applicable, for example, as described in U.S. Ser. No. 11/333,066, filed on Jan. 11, 2006, titled "A METHOD AND SYSTEM FOR MEMORY PROTECTION AND SECURITY USING CREDENTIALS", which is assigned to the common assignees. It should also be noted that in case that a late pinning is required, for example, if the mapping is not known at the time the $CAP_M$ is generated, then a null $CAP_M$ may be sent to the DC, e.g., a $CAP_M$ without a valid $M_{ID}$, to trigger a page fault when the DMA operation is initiated by the DC.

DC 46 may send the DMA operations to HG 42 with the relevant TCE's and $CAP_M$. HG 42 may use this information to verify and translate the virtual address. If HG 42 determines that $CAP_M$ is valid, e.g., valid credential, time within the time window, and $M_{ID}$ is not listed in the list of revoked credentials used by HG 42 to manage the renewal of the credentials, then the translation may be done and the DMA operation may proceed. In case the translation is invalid, HG 42 may send a retry request to DC 46. Additionally, HG 42 may request a mapping from upper layers. Once a new mapping is received, the updated $CAP_M$ may be sent to DC 46, which may now retry the DMA operation.

It should be noted that a mapping may be invalid, for example, in the following cases:
  a late pinning was requested (e.g., by a null $CAP_M$), or
  a mapping update has been received from the OS or hypervisor with in the previous TW.

In the latter case HG 42 may add the $M_{ID}$ to the revoked list, which may be used to check any new arriving translation. Since $CAP_M$ must be renewed every TW, the revoked list is limited in length, as described in U.S. Ser. No. 11/333,066, filed on Jan. 11, 2006, titled "A METHOD AND SYSTEM FOR MEMORY PROTECTION AND SECURITY USING CREDENTIALS", which is assigned to the common assignees.

Furthermore, in accordance with some embodiments of the present invention, HG 42 and DC 46 are not required to store any state information of the data being transferred, e.g., they may be stateless. As described above, the only common state is the revoked list kept by HG 42. The TCE's may be distributed throughout the various DC's 46 without requiring global synchronization, e.g., OS or hypervisor page table update notifications (which may require updating the relevant TCE) may be sent only to the HG 42, and only on a mapping failure an update may be sent to the relevant DC 46.

In the description above, numerous specific details were set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code that embodies aspects of the present invention is typically maintained in permanent storage, such as a computer readable medium. In a client-server environment, such software programming code may be stored on a client or server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software. For example, HG 42 may be embodied in computer software, or alternatively, in part or in whole using hardware components.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the forgoing description.

The invention claimed is:

1. A method for centralized memory address translation and pinning by a host gateway in a computing system, the method comprising:

attaching a memory address space identifier for a memory address space of a consumer to a direct memory access (DMA) request sent by the consumer;

translating a virtual address included in the DMA request to a physical page frame in memory, using a mapping that maps the virtual address in the memory address space of the consumer to the physical page frame;

raising an input/output (I/O) miss interrupt call to a hypervisor or operating system running the consumer to establish the mapping, in response to determining that the mapping does not exist; and pinning the physical page frame as long as the DMA request is in progress to prevent the hypervisor or operating system running the consumer from unmapping the virtual address from physical page frame, wherein the DMA request further comprises a consumer identifier that is used to determine the memory address space identifier, wherein the hypervisor or operating system running the consumer aborts the unmapping or retries the unmapping after a waiting period, in response to determining that the physical page frame is pinned, wherein the attaching, translating, and pinning are performed independently of the hypervisor or operating system running the consumer, wherein the pinning comprises marking the physical page frame to notify the hypervisor or operating system running the consumer that the physical page frame is currently involved in the DMA request, and wherein a first type of mark indicates that the physical page frame is currently involved in a read or write I/O operation, and wherein a second type of mark indicates that the physical page frame has previously been involved in at least one read I/O operation without knowledge of the hypervisor or operating system running the consumer.

2. The method of claim 1, wherein the DMA request further comprises length of the DMA request.

3. The method of claim 1, wherein the translating comprises looking up the mapping in page tables located in the memory address space of the consumer.

4. The method of claim 1, wherein the translating comprises looking up the mapping in translation control entry (TCE) tables located in device controllers for I/O devices performing the DMA request.

5. The method according to claim 4, wherein the mapping is associated with a mapping identification.

6. The method according to claim 5, further comprising creating a mapping credential to protect integrity of the DMA request.

7. The method according to claim 6, further comprising verifying the virtual address using the mapping identification and the mapping credential.

8. The method according to claim 1 wherein the host gateway is integrated with a memory management unit (MMU) of a processing unit.

9. The method according to claim 8, wherein the attaching is controlled by the host gateway, and wherein the translating and pinning are controlled by the MMU.

* * * * *